US011073422B2

(12) United States Patent
Chen

(10) Patent No.: US 11,073,422 B2
(45) Date of Patent: Jul. 27, 2021

(54) PROJECTOR AND LIGHT DETECTION CIRCUIT AND LIGHT DETECTION METHOD THEREOF

(71) Applicants: BenQ Intelligent Technology (Shanghai) Co., Ltd, Shanghai (CN); BENQ CORPORATION, Taipei (TW)

(72) Inventor: Shih-Pin Chen, Taoyuan (TW)

(73) Assignees: BenQ Intelligent Technology (Shanghai) Co., Ltd., Shanghai (CN); BENQ CORPORATION, Taipei (TW)

(*) Notice: Subject to any disclaimer, the term of this patent is extended or adjusted under 35 U.S.C. 154(b) by 55 days.

(21) Appl. No.: 16/797,021

(22) Filed: Feb. 21, 2020

(65) Prior Publication Data

US 2020/0284653 A1    Sep. 10, 2020

(30) Foreign Application Priority Data

Mar. 5, 2019    (CN) .......................... 201910162058.9

(51) Int. Cl.
*G01J 1/46* (2006.01)
*G02B 26/00* (2006.01)
(Continued)

(52) U.S. Cl.
CPC .............. *G01J 1/46* (2013.01); *G02B 26/008* (2013.01); *G03B 21/2006* (2013.01); *G01J 2001/4473* (2013.01)

(58) Field of Classification Search
CPC .... G01J 1/46; G01J 2001/4473; G01J 1/0228; G02B 26/008; G03B 21/2006;
(Continued)

(56) References Cited

U.S. PATENT DOCUMENTS 4,529,928 A  *  7/1985  Rogers .................... G05F 3/265
                                                    323/280
6,084,235 A     7/2000  Breithaupt et al.
(Continued)

FOREIGN PATENT DOCUMENTS

CN        1213236 A      4/1999
CN      102096165 A      6/2011
(Continued)

OTHER PUBLICATIONS

Office action of counterpart application by Taiwan IP Office dated Oct. 29, 2020.

*Primary Examiner* — Seung C Sohn

(57) ABSTRACT

A light detection circuit for a projector is provided. The light detection circuit includes: a light transistor for receiving and sensing reflected light from a side of a color wheel driving motor of the projector, wherein the side of the color wheel driving motor includes a dark region and a bright region; a bias unit coupled to the light transistor for providing a bias voltage; an operation amplifier including a positive input coupled to the bias unit, a negative input coupled to the light transistor and the bias unit, and an output, the base unit providing the bias voltage to the positive input; and a feedback resistor coupled between the negative input of the operation amplifier and the output, wherein, a resistance of the feedback resistor causes the light transistor to be operated in a linear region.

18 Claims, 2 Drawing Sheets

(51) Int. Cl.
*G03B 21/20* (2006.01)
*G01J 1/44* (2006.01)

(58) Field of Classification Search
CPC .................. G03B 33/08; G03B 21/206; G09G 2310/0235; G09G 2360/145; G09G 3/002; H04N 9/3114
See application file for complete search history.

(56) References Cited

U.S. PATENT DOCUMENTS

| | | | |
|---|---|---|---|
| 6,723,554 B1 * | 4/2004 | Gaillon | G01N 21/03 356/300 |
| 7,202,468 B2 | 4/2007 | Shahbazi et al. | |
| 7,485,847 B2 | 2/2009 | Degertekin et al. | |
| 2004/0239704 A1 | 12/2004 | Soar | |
| 2016/0124213 A1 | 5/2016 | Yang | |
| 2017/0045382 A1 | 2/2017 | Chang et al. | |

FOREIGN PATENT DOCUMENTS

| | | |
|---|---|---|
| CN | 102998257 A | 3/2013 |
| CN | 103969926 A | 8/2014 |
| CN | 104181759 A | 12/2014 |
| CN | 103389613 B | 4/2017 |
| CN | 106941340 A | 7/2017 |
| TW | I484651 B | 5/2015 |

* cited by examiner

PROJECTOR AND LIGHT DETECTION CIRCUIT AND LIGHT DETECTION METHOD THEREOF

This application claims the benefit of People's Republic of China application Serial No. 201910162058.9, filed Mar. 5, 2019, the subject matter of which is incorporated herein by reference.

BACKGROUND OF THE INVENTION

Field of the Invention

The invention relates in general to a projector and a light detection circuit and a light detection method thereof.

Description of the Related Art

The digital light processing (DLP) projector has been provided for many years. The DLP projector advantageously has excellent light/dark contrast, tight, sharp and clear pixels, and small size.

The DLP projector uses an optical element such as digital micromirror device (DMD). Each DMD chip includes more than 2,000,000 micro-mirrors capable of reflecting a solid color light. The key component of the DLP projector is a color wheel whose RGB color order is controlled by a color wheel index signal.

However, detection or reading of the color wheel index signal may be affected by environmental dust or element sensitivity.

Therefore, it has become a prominent task for the industry to provide a projector and a light detection circuit and a light detection method to greatly increase the noise margin and the quality of the DLP projector.

SUMMARY OF THE INVENTION

The invention relates to a projector and a light detection circuit capable of accurately detecting a color wheel index signal and precisely controlling the rotation of the color wheel to increase the imaging quality of projection.

According to an embodiment of the present invention, a light detection circuit for a projector is provided. The light detection circuit for a projector includes: a light transistor for receiving and sensing a reflected light from a side of a color wheel driving motor of the projector, wherein the side of the color wheel driving motor includes a dark region and a bright region; a bias unit coupled to the light transistor for providing a bias voltage; an operation amplifier coupled to the light transistor and the bias unit, wherein the operation amplifier comprises a positive input, a negative input and an output, the positive input of the operation amplifier is coupled to the bias unit, the negative input of the operation amplifier is coupled to the light transistor and the bias unit, the bias unit providing the bias voltage to the positive input of the operation amplifier; and a feedback resistor coupled between the negative input of the operation amplifier and the output, wherein, a resistance of the feedback resistor causes the light transistor to be operated in a linear region.

According to another embodiment of the present invention, a projector is provided. The projector includes: a color wheel driving motor and a light detection circuit, wherein the side of the color wheel driving motor includes a dark region and a bright region. The light detection circuit includes: a light transistor for receiving and sensing a reflected light from the side of the color wheel driving motor; a bias unit coupled to the light transistor for providing a bias voltage; an operation amplifier coupled to the light transistor and the bias unit, wherein the operation amplifier comprises a positive input, a negative input and an output, the positive input of the operation amplifier is coupled to the bias unit, the negative input of the operation amplifier is coupled to the light transistor and the bias unit, the bias unit providing the bias voltage to the positive input of the operation amplifier; and a feedback resistor coupled between the negative input of the operation amplifier and the output, wherein, a resistance of the feedback resistor causes the light transistor to be operated in a linear region.

According to an embodiment of the present invention, provided is a light detection method for a projector having a color wheel driving motor, a side of the color wheel driving motor including a dark region and a bright region, the light detection method comprising: receiving and sensing a reflected light from the side of the color wheel driving motor by a light transistor; providing a bias voltage to a positive input of an operation amplifier by a bias unit coupled to the light transistor, the operation amplifier coupled to the light transistor and the bias unit, the operation amplifier comprising a positive input, a negative input and an output, the positive input of the operation amplifier coupled to the bias unit, the negative input of the operation amplifier coupled to the light transistor and the bias unit; and causing the light transistor to be operated in a linear region by a resistance of a feedback resistor coupled between the negative input of the operation amplifier and the output.

The projector and the light detection circuit and the light detection method of the invention enable the light transistor to work at a linear region to receive a reflected light from the side of the color wheel driving motor. Since the side of the color wheel driving motor includes a dark region and a bright region, the amount of the reflected light will change. Furthermore, the amount of the reflected light within the linear region is highly correlated with (such as positively or nearly positively proportional to) the current flowing through the light transistor, and the magnitude of the output voltage of the operation amplifier will correspondingly change. Based on the change in the magnitude of the output voltage of the operation amplifier, the color wheel index signal can be accurately detected, the rotation of the color wheel can be precisely controlled and the imaging quality of projection can be increased.

The above and other aspects of the invention will become better understood with regards to the following detailed description of the preferred but non-limiting embodiment(s). The following description is made with reference to the accompanying drawings.

DETAILED DESCRIPTION OF THE INVENTION

Technical terms are used in the specification with reference to generally-known terminologies used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all the technical features of any embodiment of the present disclosure.

Figure 1:
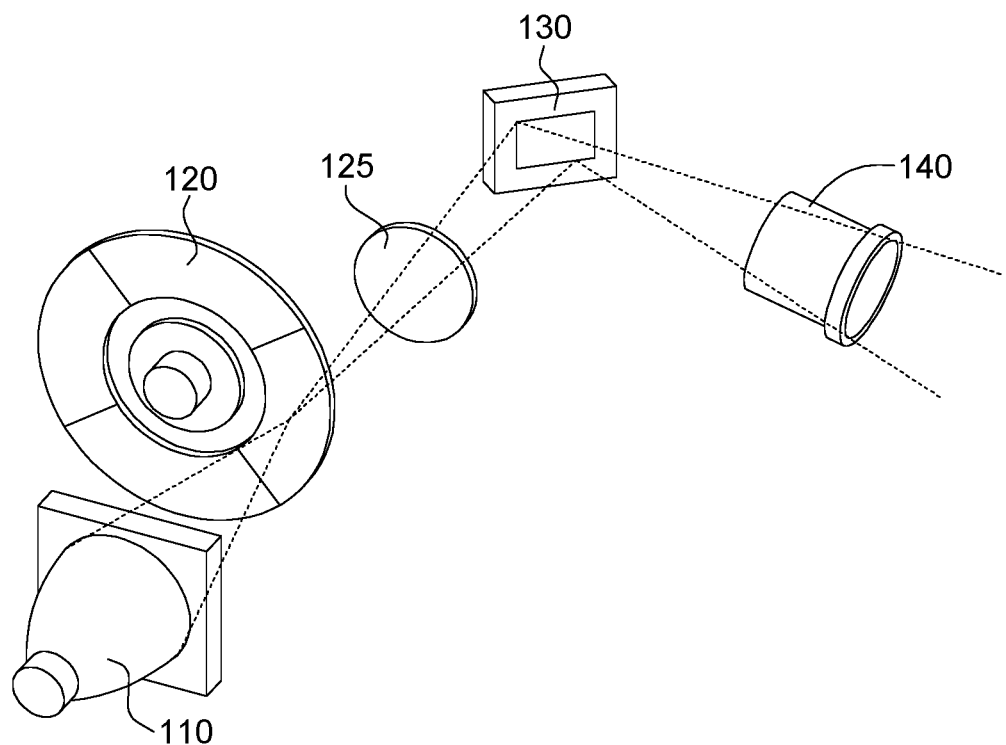
FIG. 1 is a main structure diagram of a projector according to the invention.

FIG. 1 is a main structure diagram of a projector according to the invention. As indicated in FIG. 1, the main structure of the DLP the projector 100 includes: a light source 110, a color wheel 120, a concentrating lens 125, a digital micromirror device (DMD) chip 130 and a projection lens 140. A white light emitted by the light source 110 passes through the color wheel 120. The color wheel 120, being rotated at a high speed, separates the white light to form a red light, a green light or a blue light. The red light, the green light and the blue light separated by the color wheel 120 are further concentrated by the concentrating lens 125, projected to pleural micromirrors disposed on the DMD chip 130, and reflected to the projection lens 140 to form an image on the screen (not illustrated).

Figure 2:
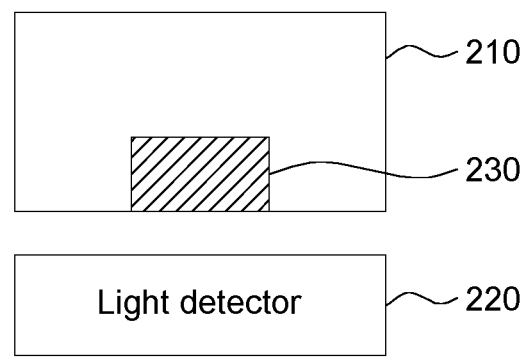
FIG. 2 is a schematic diagram of a side of a color wheel driving motor of a projector and a light detector according to an embodiment of the invention.

FIG. 2 is a schematic diagram of a side of a color wheel driving motor of a projector and a light detector according to an embodiment of the invention. The DLP projector 100 further includes a color wheel driving motor 210 and a light detector 220. The color wheel driving motor 210 is for rotating the color wheel 120. A side of the color wheel driving motor 210 has a small dark patch (also referred as dark region) 230, and the remaining part of the side of the color wheel driving motor 210 is bright (also referred as bright region), wherein, the area of the bright region is greater than that of the dark region 230. The rotation angel of the color wheel can be obtained from the amount of the light reflected from the side of the color wheel driving motor 210 and detected by the light detector 220. After the reflected light is processed, a color wheel index signal can be obtained from the reflected light.

Figure 3:
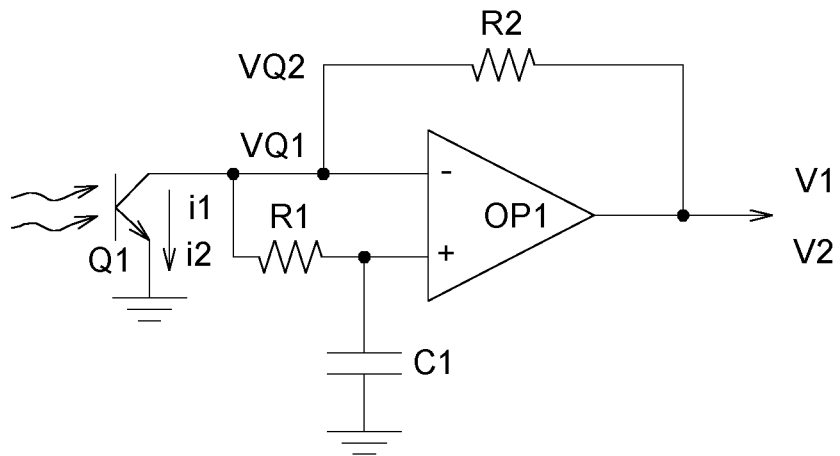
FIG. 3 is a circuit structure diagram of a light detection circuit of a projector according to an embodiment of the invention.

FIG. 3 is a circuit structure diagram of a light detection circuit of a projector according to an embodiment of the invention. The light detector 220 includes a light detection circuit 300. As indicated in FIG. 3, the light detection circuit 300 of the invention includes an operation amplifier OP1, a light transistor Q1, a first resistor R1, a second resistor R2 and a first capacitor C1, wherein, the first resistor R1 and the first capacitor C1 form a bias unit for providing a stable bias voltage to the positive input of the operation amplifier OP1.

As indicated in FIG. 3, the operation amplifier OP1 includes: a positive input, a negative input and an output. The positive input of the operation amplifier OP1 is coupled to the coupling node between the first resistor R1 and the first capacitor C1 for receiving a stable bias voltage provided by the bias unit (formed by the first resistor R1 and the first capacitor C1). The negative input of the operation amplifier OP1 is coupled to the first resistor R1, the second resistor R2 and the light transistor Q1. The output voltage of the operation amplifier OP1 can be regarded as a color wheel index signal or can be further processed as a color wheel index signal by a backend circuit.

The light transistor Q1 receives an amount of reflected light from a side of the color wheel driving motor and generates a transistor current. In practical operation, the light transistor Q1 is disposed close to the side of the color wheel driving motor 210, and the light transistor Q1 faces (right opposite to) a part of the side of the color wheel driving motor 210.

One end of the first resistor R1 is coupled to the positive input of the operation amplifier OP1, and the other end of the first resistor R1 is coupled to the negative input of the operation amplifier OP1. That is, the first resistor R1 is coupled between the positive input of the operation amplifier OP1 and the negative input of the operation amplifier OP1.

The second resistor R2 is used as a feedback resistor. One end of the second resistor R2 is coupled to the output of the operation amplifier OP1, and the other end of the second resistor R2 is coupled to the negative input of the operation amplifier OP1. That is, the second resistor R2 is coupled between the output of the operation amplifier OP1 and the negative input of the operation amplifier OP1.

One end of the first capacitor C1 is coupled to the positive input of the operation amplifier OP1, and the other end of the first capacitor C1 is grounded.

Figure 4:
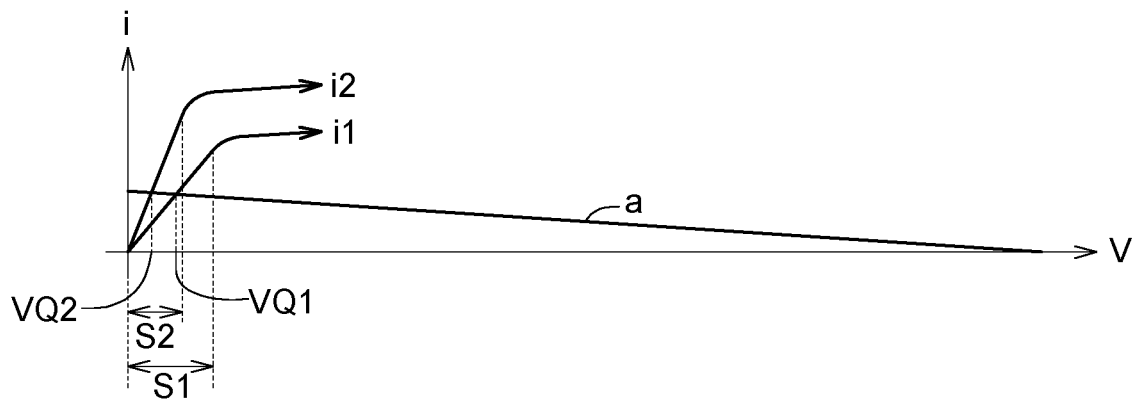
FIG. 4 is a voltage vs current (V-I) chart of a light transistor according to an embodiment of the invention.

FIG. 4 is a voltage vs current (V-I) chart of a light transistor Q1 according to an embodiment of the invention. The load line "a" represents the V-I curve of the second resistor R2. The current i1 corresponds to the V-I curve of the light transistor Q1 when the dark region 230 on the side of the color wheel driving motor 210 rotates to face the light transistor Q1. The current i2 corresponds to the V-I curve of the light transistor Q1 when the bright region on the side of the color wheel driving motor 210 rotates to face the light transistor Q1. The corresponding curve of the current i1 includes a linear region S1, and the corresponding curve of the current i2 includes a linear region S2. Within the linear region S1 or S2, the voltage generated at the coupling node between the light transistor Q1 and the first resistor R1 is positively proportional to the magnitude of the transistor current generated by the light transistor Q1.

When the light transistor Q1 receives a reflected light from the dark region 230 on the side of the color wheel driving motor, the light transistor Q1 generates a transistor current i1, and the coupling node between the light transistor Q1 and the first resistor generates a voltage VQ1. When the light transistor Q1 receives a reflected light from the bright region on the side of the color wheel driving motor, the light transistor Q1 generates a transistor current i2, and the coupling node between the light transistor Q1 and the first resistor generates a voltage VQ2.

For the convenience of explanation, the resistance of the second resistor R2 is exemplarily set as 2 M$\Omega$, and the saturated maximum output voltage of the operation amplifier OP1 is exemplarily set as 4V, but the invention is not limited thereto.

When the light transistor Q1 receives a reflected light from the bright region on the side of the color wheel driving motor, the output voltage V2 of the operation amplifier OP1 is a saturated maximum output voltage (4V), that is, V2=VQ2+i2*R2. Meanwhile, the light transistor Q1 is turned on, the emitter of the light transistor Q1 is grounded, and a current flows from the output of the operation amplifier OP1 and passes through the second resistor R2 and the light transistor Q1 in order. Since the second resistor R2 has a huge resistance of 2M$\Omega$, most of the voltage V2 (=4V) is shared by the second resistor R2, the voltage VQ2 is far less than 4V (for example, the voltage VQ2 may be equivalent to 0.15V), and i2$\approx$V2/R2$\approx$4V/2M$\Omega$=2 $\mu$A.

When the light transistor Q1 receives a reflected light from the dark region 230 on the side of the color wheel driving motor, the output voltage V1 of the operation amplifier OP1 can be expressed as: V1=VQ1+i1*R2. Similarly, the light transistor Q1 is turned on. Since the second resistor R2 has a huge resistance of 2MΩ, most of the voltage V1 is shared by the second resistor R2, the voltage VQ1 is far less than 4V. The voltages VQ1 and VQ2 can be obtained from the V-I chart of the light transistor. As indicated in FIG. 4, within the linear region S2, the corresponding curve of the current i1 and the corresponding curve of the current i2 are very close to each other and substantially have an identical slope. Therefore, when the second resistor R2 has a larger resistance (such as 2MΩ), the voltages VQ1 and VQ2 are substantially identical. Here, VQ1 and VQ2 both are exemplified by about 0.15V. The voltages VQ1 and VQ2 are the intersection points between the V-I curves and the loading line as indicated in FIG. 4.

Suppose the amount of the light reflected from the bright region on the side of the color wheel driving motor is about 10 times of the amount of the light reflected from the dark region on the side of the color wheel driving motor. When the light transistor Q1 is operated in a linear region, the current of the light transistor Q1 is highly correlated with the amount of the received light (in the present embodiment, the current of the light transistor Q1 is positively proportional to the amount of the received light). That is, i2 is about 10 times of i1. i1=0.2 µA, V1=VQ1+i1*R2=0.15+0.2 µA*2MΩ=0.55V.

Basically the light transistor Q1 is operated in a linear region (a large resistance of the second resistor R2 causes the light transistor Q1 to be operated in a linear region) unless the amount of the light received by the light transistor Q1 is very small and cannot cause the light transistor Q1 to enter the linear region. In the present embodiment, when the projector 100 operates normally, the amount of the light received by the light transistor Q1 is enough to cause the light transistor Q1 to operate in a linear region.

Figure 5:
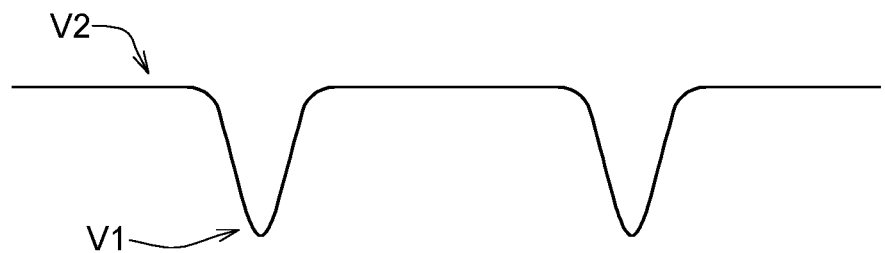
FIG. 5 is a waveform chart of the output voltage of FIG. 3 according to the invention.

FIG. 5 is a waveform chart of an output voltage of an operation amplifier OP1 according to the invention. When the light reflected from the bright region on the side of the color wheel driving motor 210 is received by the light detection circuit 300, the operation amplifier OP1 of the light detection circuit 300 has an output voltage of V2 (=4V as in the above example). When the light reflected from the dark region on the side of the color wheel driving motor 210 is received by the light detection circuit 300, the operation amplifier OP1 of the light detection circuit 300 has an output voltage of V1 (=0.55V as in the above example).

As disclosed above, the voltage V2 is far higher than the voltage V1. That is, through subsequent circuit processing, an excellent color wheel index signal can be obtained, such that the rotation angle of the color wheel driving motor can be clearly recognized, and the color wheel ca be more precisely controlled to obtain better imaging quality of projection.

Further, another embodiment of the invention provides a light detection method for a projector having a color wheel driving motor, a side of the color wheel driving motor including a dark region and a bright region, the light detection method comprising: receiving and sensing a reflected light from the side of the color wheel driving motor by a light transistor; providing a bias voltage to a positive input of an operation amplifier by a bias unit coupled to the light transistor, the operation amplifier coupled to the light transistor and the bias unit, the operation amplifier comprising a positive input, a negative input and an output, the positive input of the operation amplifier coupled to the bias unit, the negative input of the operation amplifier coupled to the light transistor and the bias unit; and causing the light transistor to be operated in a linear region by a resistance of a feedback resistor coupled between the negative input of the operation amplifier and the output.

Therefore, the projector and the light detection circuit and the light detection method thereof of the invention at least have the following advantages: since the output voltage is highly correlated with the amount of the light reflected from the side of the color wheel driving motor, the output voltage basically will not be affected by the amount of the reflected light.

According to the above embodiments of the invention, the projector 100 and the feedback resistor of the light detection circuit 300 cause the light transistor Q1 to operate in a linear region and receive a reflected light from the side of the color wheel driving motor 210. Since the side of the color wheel driving motor 210 includes a dark region 230 and a bright region, the amount of the reflected light will change, and within the linear region, the amount of the reflected light is highly correlated with (such as positively or nearly positively proportional to) the current flowing through the light transistor Q1, and the magnitude of the output voltage of the operation amplifier OP1 will correspondingly change. Based on the change in the magnitude of the output voltage of the operation amplifier OP1, the color wheel index signal can be accurately detected, the rotation of the color wheel can be precisely controlled and the imaging quality of projection can be increased.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light detection circuit for a projector, comprising:
a light transistor for receiving and sensing a reflected light from a side of a color wheel driving motor of the projector, wherein the side of the color wheel driving motor comprises a dark region and a bright region;
a bias unit coupled to the light transistor for providing a bias voltage;
an operation amplifier coupled to the light transistor and the bias unit, wherein the operation amplifier comprises a positive input, a negative input and an output, the positive input of the operation amplifier is coupled to the bias unit, the negative input of the operation amplifier is coupled to the light transistor and the bias unit, the bias unit providing the bias voltage to the positive input of the operation amplifier; and
a feedback resistor coupled between the negative input of the operation amplifier and the output, wherein, a resistance of the feedback resistor causes the light transistor to be operated in a linear region.

2. The light detection circuit according to claim 1, wherein, the bias unit comprises a first resistor and a first capacitor respectively coupled to the operation amplifier, and the positive input of the operation amplifier is coupled to a coupling node between the first resistor and the first capacitor.

3. The light detection circuit according to claim 2, wherein, one end of the first resistor is coupled to the positive input of the operation amplifier, and the other end of the first resistor is coupled to the negative input of the operation amplifier.

4. The light detection circuit according to claim 2, wherein, one end of the first capacitor is coupled to the positive input of the operation amplifier, and the other end of the first capacitor is grounded.

5. The light detection circuit according to claim 1, wherein, one end of the feedback resistor is coupled to the output of the operation amplifier, and the other end of the feedback resistor is coupled to the negative input of the operation amplifier.

6. The light detection circuit according to claim 1, wherein, when the light transistor receives a reflected light from the bright region on the side of the color wheel driving motor, an output voltage of the operation amplifier reaches a saturated maximum output voltage.

7. A projector, comprising:
a color wheel driving motor, wherein a side of the color wheel driving motor comprises a dark region and a bright region; and
a light detection circuit, comprising:
   a light transistor for receiving and sensing a reflected light from the side of the color wheel driving motor;
   a bias unit coupled to the light transistor for providing a bias voltage;
   an operation amplifier coupled to the light transistor and the bias unit, wherein the operation amplifier comprises a positive input, a negative input and an output, the positive input of the operation amplifier is coupled to the bias unit, the negative input of the operation amplifier is coupled to the light transistor and the bias unit, the bias unit providing the bias voltage to the positive input of the operation amplifier; and
   a feedback resistor coupled between the negative input of the operation amplifier and the output, wherein, a resistance of the feedback resistor causes the light transistor to be operated in a linear region.

8. The projector according to claim 7, wherein, the bias unit comprises a first resistor and a first capacitor respectively coupled to the operation amplifier, and the positive input of the operation amplifier is coupled to a coupling node between the first resistor and the first capacitor.

9. The projector according to claim 8, wherein, one end of the first resistor is coupled to the positive input of the operation amplifier, and the other end of the first resistor is coupled to the negative input of the operation amplifier.

10. The projector according to claim 8, wherein, one end of the first capacitor is coupled to the positive input of the operation amplifier, and the other end of the first capacitor is grounded.

11. The projector according to claim 7, wherein, one end of the feedback resistor is coupled to the output of the operation amplifier, and the other end of the feedback resistor is coupled to the negative input of the operation amplifier.

12. The projector according to claim 7, wherein, when the light transistor receives a reflected light from the bright region on the side of the color wheel driving motor, an output voltage of the operation amplifier reaches a saturated maximum output voltage.

13. A light detection method for a projector having a color wheel driving motor, a side of the color wheel driving motor including a dark region and a bright region, the light detection method comprising:
receiving and sensing a reflected light from the side of the color wheel driving motor by a light transistor;
providing a bias voltage to a positive input of an operation amplifier by a bias unit coupled to the light transistor, the operation amplifier coupled to the light transistor and the bias unit, the operation amplifier comprising a positive input, a negative input and an output, the positive input of the operation amplifier coupled to the bias unit, the negative input of the operation amplifier coupled to the light transistor and the bias unit; and
causing the light transistor to be operated in a linear region by a resistance of a feedback resistor coupled between the negative input of the operation amplifier and the output.

14. The light detection method according to claim 13, wherein, the bias unit comprises a first resistor and a first capacitor respectively coupled to the operation amplifier, and the positive input of the operation amplifier is coupled to a coupling node between the first resistor and the first capacitor.

15. The light detection method according to claim 14, wherein, one end of the first resistor is coupled to the positive input of the operation amplifier, and the other end of the first resistor is coupled to the negative input of the operation amplifier.

16. The light detection method according to claim 14, wherein, one end of the first capacitor is coupled to the positive input of the operation amplifier, and the other end of the first capacitor is grounded.

17. The light detection method according to claim 13, wherein, one end of the feedback resistor is coupled to the output of the operation amplifier, and the other end of the feedback resistor is coupled to the negative input of the operation amplifier.

18. The light detection method according to claim 13, wherein, when the light transistor receives a reflected light from the bright region on the side of the color wheel driving motor, an output voltage of the operation amplifier reaches a saturated maximum output voltage.

* * * * *